United States Patent
Hammer (10) Patent No.: US 9,327,662 B1
(45) Date of Patent: May 3, 2016

(54) BUMPER ASSEMBLIES INCLUDING LOWER REINFORCEMENT MEMBERS

(71) Applicant: Toyota Motor Engineering & Manufacturing North America, Inc., Erlanger, KY (US)

(72) Inventor: Jeremiah Thomas Hammer, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/551,562

(22) Filed: Nov. 24, 2014

(51) Int. Cl.
*B60R 19/36* (2006.01)
*B60R 19/12* (2006.01)
*B60R 21/34* (2011.01)
*B60R 19/18* (2006.01)

(52) U.S. Cl.
CPC .............. *B60R 19/12* (2013.01); *B60R 19/18* (2013.01); *B60R 21/34* (2013.01); *B60R 2019/1806* (2013.01); *B60R 2019/1886* (2013.01)

(58) Field of Classification Search
CPC ........ B60R 19/18; B60R 19/34; B60R 19/12; B60R 2019/1886; B60R 2019/186; B60R 21/152; B60R 2019/1813
USPC .............. 293/146, 102, 117, 120, 133, 155; 296/187.09, 193.09, 203.02
See application file for complete search history.

(56) References Cited

U.S. PATENT DOCUMENTS

| | | | | |
|---|---|---|---|---|
| 4,466,646 A * | 8/1984 | Delmastro | .............. | B60R 19/50 293/117 |
| 5,066,057 A * | 11/1991 | Furuta | ..................... | B60R 19/18 293/121 |
| 5,580,109 A * | 12/1996 | Birka | ...................... | B60R 19/18 293/120 |
| 5,988,714 A * | 11/1999 | Akazawa | ................ | B60R 19/18 293/120 |
| 6,089,628 A * | 7/2000 | Schuster | ................. | B60R 19/12 293/118 |
| 6,485,072 B1 | 11/2002 | Werner et al. | | |
| 6,609,740 B2 | 8/2003 | Evans | | |
| 6,886,872 B2 | 5/2005 | Matsumoto et al. | | |
| 7,114,587 B2 * | 10/2006 | Mori | ..................... | B60K 11/04 180/68.3 |
| 7,134,700 B2 * | 11/2006 | Evans | ..................... | B60R 19/18 293/120 |
| 7,144,054 B2 | 12/2006 | Evans | | |
| 7,222,894 B2 | 5/2007 | Suwa | | |
| 7,581,769 B2 | 9/2009 | Wakabayashi et al. | | |
| 7,597,383 B2 | 10/2009 | Itou et al. | | |
| 7,607,720 B2 | 10/2009 | Noyori et al. | | |
| 7,726,428 B2 * | 6/2010 | Kowalski | ............. | B62D 25/084 180/68.4 |
| 8,523,251 B1 | 9/2013 | Fortin et al. | | |

(Continued)

*Primary Examiner* — Kiran B Patel
(74) *Attorney, Agent, or Firm* — Dinsmore & Shohl LLP (57) ABSTRACT

A bumper assembly includes a bumper fascia and a bumper reinforcement beam covered by the bumper fascia providing an upper projecting bumper portion. A lower reinforcement member is below the bumper reinforcement beam in a vehicle vertical direction and is covered by the bumper fascia providing a lower projecting bumper portion. The lower reinforcement member includes a reinforcement body having a front end and a rear end. The bumper fascia is connected to the lower reinforcement member at a fastening location that is located below reinforcement body.

10 Claims, 6 Drawing Sheets

(56) References Cited

U.S. PATENT DOCUMENTS

| | | | |
|---|---|---|---|
| 8,579,358 B2* | 11/2013 | Meeks | B62D 35/005 180/903 |
| 2003/0034658 A1* | 2/2003 | Cate | F16F 7/003 293/109 |
| 2003/0211311 A1* | 11/2003 | Porter | B29C 45/1642 428/318.8 |
| 2004/0124643 A1* | 7/2004 | Matsumoto | B60R 19/12 293/115 |
| 2004/0130167 A1* | 7/2004 | Mori | B60R 19/18 293/102 |
| 2005/0017520 A1* | 1/2005 | Evans | B60R 19/18 293/120 |
| 2007/0069535 A1* | 3/2007 | Mohapatra | B60R 19/18 293/121 |
| 2008/0067838 A1* | 3/2008 | Nakamae | B62D 21/152 296/203.02 |
| 2008/0203744 A1* | 8/2008 | Fortin | B60R 19/18 293/124 |
| 2009/0160203 A1* | 6/2009 | Garg | B60R 19/12 293/120 |
| 2009/0315346 A1* | 12/2009 | Schelberg | B60R 19/18 293/133 |
| 2011/0000728 A1* | 1/2011 | Mildner | B62D 25/084 180/68.1 |
| 2011/0204680 A1* | 8/2011 | Fortin | B60R 19/18 296/193.1 |
| 2012/0153643 A1* | 6/2012 | Mana | B60R 19/12 293/120 |
| 2013/0026791 A1* | 1/2013 | Huber | B60R 19/24 296/193.09 |
| 2013/0043692 A1 | 2/2013 | Chiba et al. | |
| 2013/0168982 A1* | 7/2013 | Ashiya | B60R 19/18 293/108 |
| 2014/0084608 A1* | 3/2014 | Hasegawa | B60R 19/12 293/132 |
| 2014/0312636 A1* | 10/2014 | Corwin | B60R 21/34 293/133 |
| 2014/0353991 A1* | 12/2014 | Kim | B60R 19/24 293/155 |
| 2015/0136512 A1* | 5/2015 | Tashiro | B60R 21/34 180/271 |

* cited by examiner

BUMPER ASSEMBLIES INCLUDING LOWER REINFORCEMENT MEMBERS

TECHNICAL FIELD

The present specification generally relates to bumper assemblies and vehicles that include bumper assemblies, and more specifically, bumper assemblies that include lower reinforcement members.

BACKGROUND

Vehicles may be equipped with bumper assemblies and impact protection structures that elastically and plastically deform to absorb energy in the event of an impact. A number of standards and tests currently exist. Various organizations are introducing a number of pedestrian regulations and rating criteria for automotive vehicles. As one example, test methods have been developed to assess the protection of an adult pedestrian by simulating leg-impact conditions during a car-to-pedestrian impact. Generally, under such testing conditions, a bumper assembly that is closer to the ground will decrease a bending moment seen by lower parts of the leg. Accordingly, bumper assemblies are desired that are lower to the ground.

SUMMARY

In one embodiment, a bumper assembly includes a bumper fascia and a bumper reinforcement beam covered by the bumper fascia providing an upper projecting bumper portion. A lower reinforcement member is below the bumper reinforcement beam in a vehicle vertical direction and is covered by the bumper fascia providing a lower projecting bumper portion. The lower reinforcement member includes a reinforcement body having a front end and a rear end. The bumper fascia is connected to the lower reinforcement member at a fastening location that is located below reinforcement body.

In another embodiment, a vehicle includes a vehicle support member at an underside of the vehicle. A bumper assembly at a front of the vehicle including a bumper fascia and a bumper reinforcement beam covered by the bumper fascia providing an upper projecting bumper portion. A lower reinforcement member is connected to the vehicle support member at a location below the bumper reinforcement beam in a vehicle vertical direction that is covered by the bumper fascia providing a lower projecting bumper portion. The lower reinforcement member includes a reinforcement body having a front end and a rear end. The bumper fascia is connected to the lower reinforcement member at a fastening location that is located below reinforcement body.

In another embodiment, a method of changing a characteristic of a bumper assembly of a vehicle is provided. The method includes providing a bumper assembly at a front of the vehicle comprising a bumper fascia. A bumper reinforcement beam is covered by the bumper fascia providing an upper projecting bumper portion. A lower reinforcement member is connected to a vehicle support member at a location below the bumper reinforcement beam in a vehicle vertical direction that is covered by the bumper fascia providing a lower projecting bumper portion. The lower reinforcement member includes a reinforcement body having a front end and a rear end. The bumper fascia is connected to the lower reinforcement member at a fastening location. A distance of the front end of the reinforcement body is reduced from the ground by applying a moment at the fastening location when an impact is made with the bumper fascia at the lower projecting bumper portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a bumper assembly including a bumper fascia and a bumper reinforcement beam that extends in a vehicle lateral direction that is covered by the bumper fascia forming an upper projecting bumper portion. A lower projecting bumper portion is located below the upper projecting bumper portion, nearer to the ground or road surface. The lower projecting bumper portion is formed by the bumper fascia covering a lower reinforcement member that is cantilevered to a vehicle support member and extends longitudinally forward, under hanging the bumper reinforcement beam. As will be described herein, the bumper fascia is connected to a bottom side of the lower reinforcement member such that when the lower projecting bumper portion is impacted, the lower reinforcement member flexes downwardly toward the ground such that a forward end of the lower reinforcement member lowers in elevation to decrease its distance from the ground.

Figure 1:
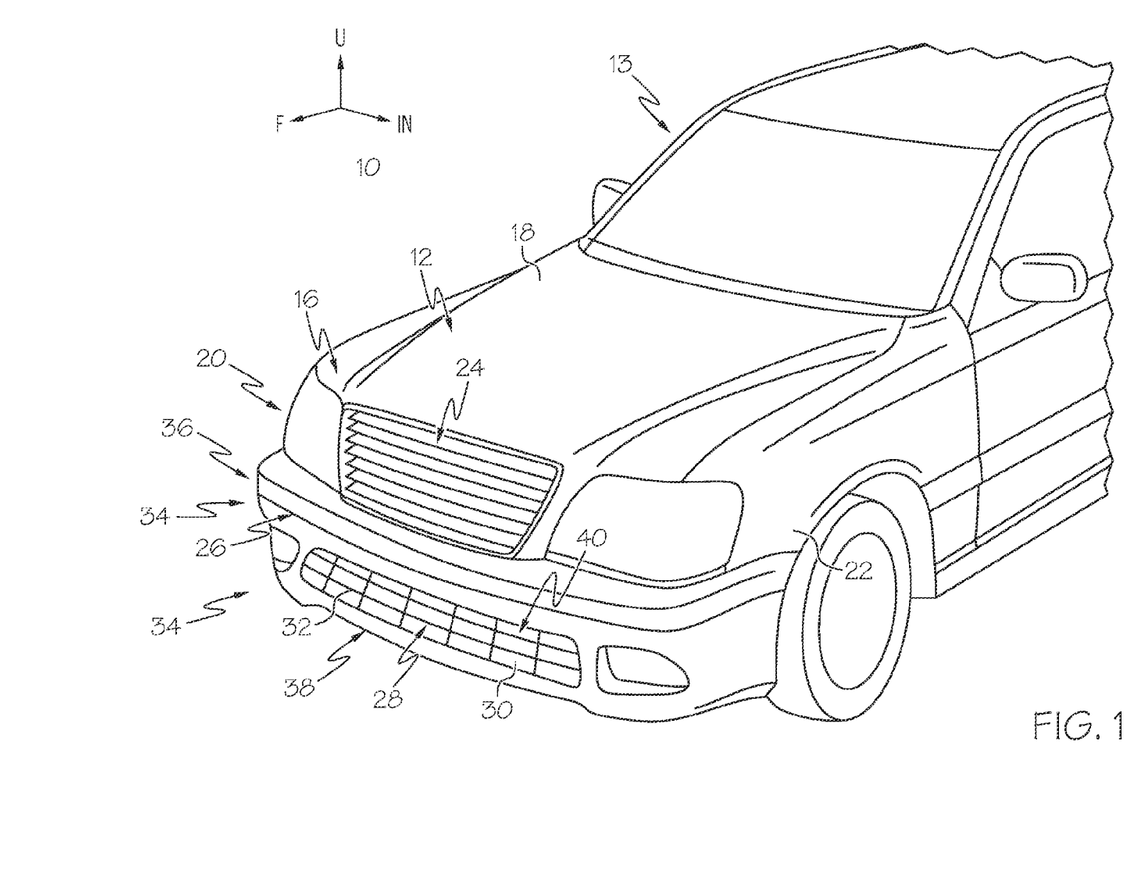
FIG. 1 schematically depicts a perspective view of a vehicle according to one or more embodiments shown or described herein.

As used herein, the term "vehicle longitudinal direction" refers to the forward-rearward direction of the vehicle (i.e., in the +/− vehicle F-direction depicted in FIG. 1). The term "vehicle lateral direction" refers to the cross-vehicle direction (i.e., in the +/− vehicle IN-direction depicted in FIG. 1), and is transverse to the vehicle longitudinal direction. The term "vehicle vertical direction" refers to the upward-downward direction of the vehicle (i.e., in the +/− vehicle U-direction depicted in FIG. 1). Further, the terms "inboard" and "outboard" are used to describe the relative positioning of various components of the vehicle with respect to a centerline of the vehicle.

Motor vehicles that incorporate elements according to the present disclosure may include a variety of construction methodologies that are conventionally known, including the unibody construction methodology depicted in FIG. 1 as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring initially to FIG. 1, a vehicle 10 is depicted. The vehicle 10 includes a unibody 12 onto which a vehicle drivetrain is coupled. The vehicle 10 also includes a cabin 13 that is integral with the unibody 12. The cabin 13 generally defines a passenger cabin of the vehicle 10. The vehicle 10 includes a front end assembly 16 that includes a hood 18, front fenders 20 and 22, an upper grille assembly 24, a front bumper assembly 26 and a lower grille assembly 28 extending between the front fenders 20 and 22. Generally, the lower grille assembly 28 includes a covering portion 30 with a number of horizontally disposed grille deflectors 32, a mesh or other suitable covering that protects a radiator behind the covering portion 30, while allowing air to flow past the covering and over the radiator. The front end assembly 16 includes an outer covering or bumper fascia 34, an upper projecting bumper portion 36 and a lower projecting bumper portion 38 that under hangs the upper projecting bumper portion 36. The lower grille assembly 28 may be located between the upper projecting bumper portion 36 and the lower projecting bumper portion 38.

Figure 2:
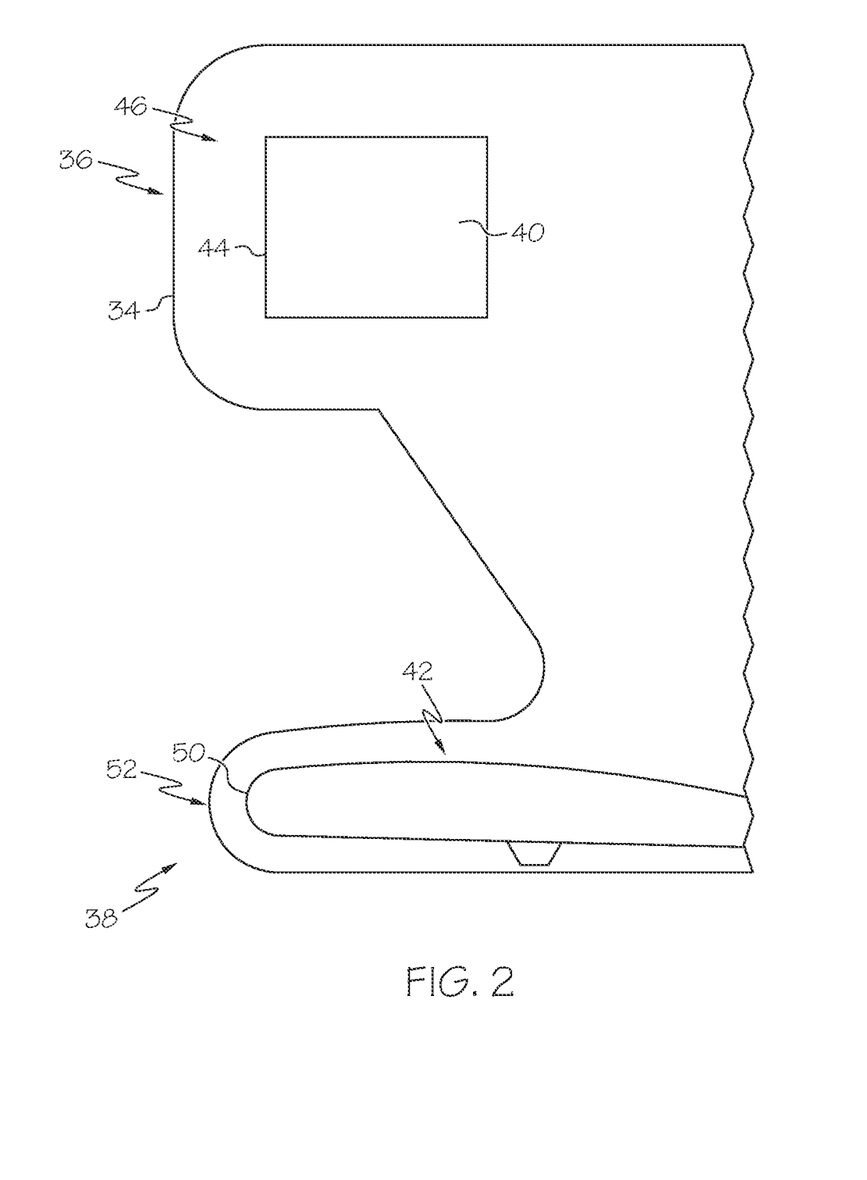
FIG. 2 depicts a diagrammatic sectional side view of a bumper assembly of the vehicle of FIG. 1 according to one or more embodiments shown or described herein.

Referring to FIG. 2, the bumper fascia 34 is an outer covering for covering a bumper reinforcement beam 40 and a lower reinforcement member 42 that both extend in the vehicle lateral direction between the front fenders 20 and 22. The bumper reinforcement beam 40 may generally have a curved shape in the vehicle lateral direction and extend forward in the vehicle longitudinal direction to a front face 44. The bumper fascia 34 also extends forward in the upper projecting bumper portion 36 to cover the bumper reinforcement beam 40. A space 46 may be provided between the bumper fascia 34 and the bumper reinforcement beam 40. The space 46 can allow for some rearward deformation of the bumper fascia 34 at the upper projecting bumper portion 36 before contacting the bumper reinforcement beam 40. In other embodiments, the space 46 may not be provided between the bumper fascia 34 and the bumper reinforcement beam 40. For example, the bumper fascia 34 may be connected directly to the bumper reinforcement beam 40.

The lower reinforcement member 42 is located below or closer to the ground than the bumper reinforcement beam 40 and extends forward in the vehicle longitudinal direction to a front end 50. The bumper fascia 34 also extends forward in the lower projecting bumper portion 38 to cover the lower reinforcement member 42. A space 52 may be provided between the bumper fascia 34 and the lower reinforcement member 42. The space 52 can allow for some rearward deformation of the bumper fascia 34 at the lower projecting bumper portion 38 before contacting the lower reinforcement member 42. In other embodiments, the space 52 may not be provided between the bumper fascia 34 and the lower reinforcement member 42. For example, the bumper fascia 34 may be connected directly to the lower reinforcement member 42 at the front end 50.

Figure 3:
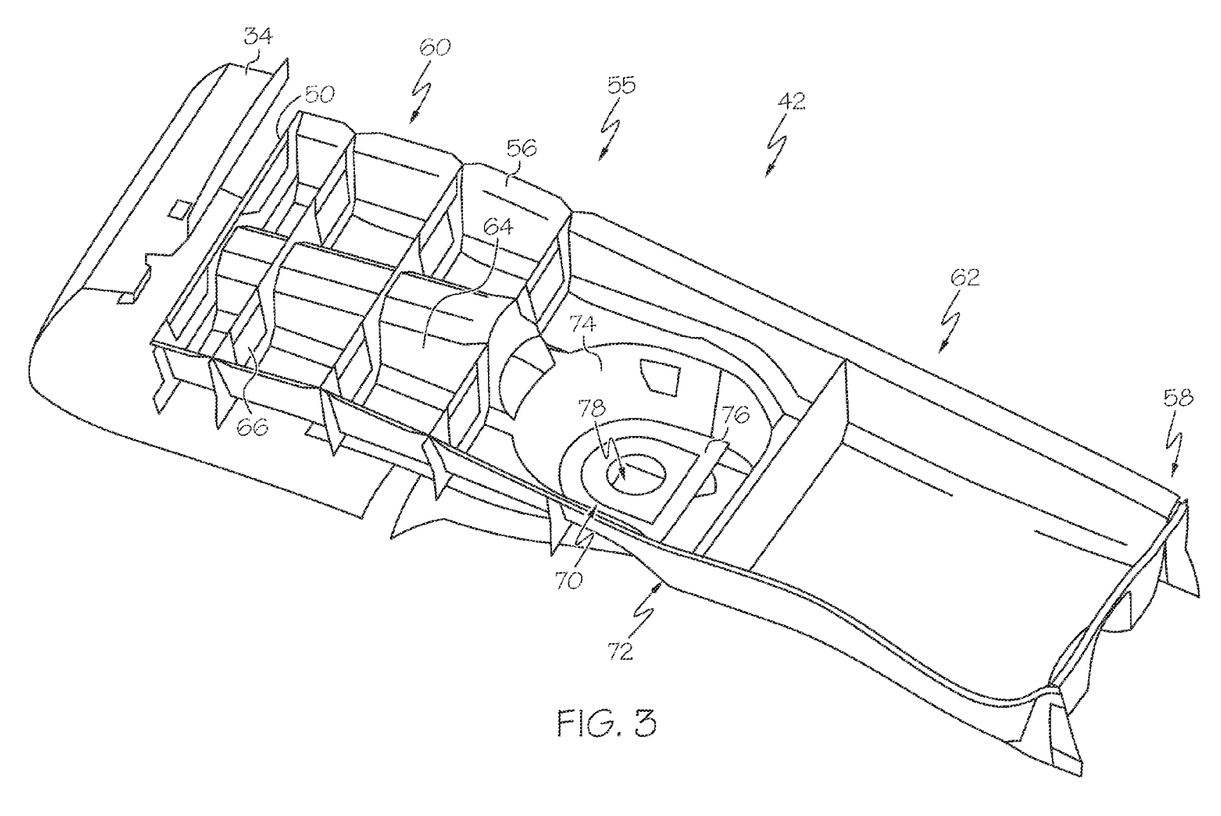
FIG. 3 depicts a perspective view of a lower projecting bumper portion including lower reinforcement member and bumper fascia according to one or more embodiments shown or described herein.

FIG. 3 illustrates a vehicle lateral portion 55 of the lower reinforcement member 42 and bumper fascia 34 in isolation to illustrate features of the lower reinforcement member 42. The lower reinforcement member 42 includes a reinforcement body 56 that has the front end 50 and a rear end 58 opposite the front end 50. In some embodiments, the front end 50 may generally have a curved shape; however, other shapes are possible such as straight of any other suitable shape. The reinforcement body 56 can be divided into a front portion 60 and a rear portion 62. The front portion 60 may include a series of longitudinal reinforcement ribs 64 that are spaced-apart in the vehicle lateral direction and a series of lateral reinforcement ribs 66 that are spaced-apart in the vehicle longitudinal direction and intersect the longitudinal reinforcement ribs 64. In some embodiments, the rear portion 62 of the reinforcement body 56 may include one or more of the reinforcement ribs 64, 66.

A fascia connection structure 70 is provided between the front portion 60 and the rear portion 62 of the reinforcement body 56. The fascia connection structure 70 may be formed as a pocket-shaped protrusion that extends downwardly from a bottom side 72 of the reinforcement body 56 toward the ground at a location spaced from both the front end 50 and the rear end 58. In the illustrated embodiment, the fascia connection structure 70 includes a side wall 74 extending outwardly from the bottom side 72 in the vehicle vertical direction and a connecting base 76 that extends outwardly from the side wall 74 in the vehicle longitudinal direction. The connecting base 76 may include a connector opening 78 extending therethrough for receiving a connecting structure, such as a fastener for fastening the reinforcement body 56 to the bumper fascia 34.

Figure 4:
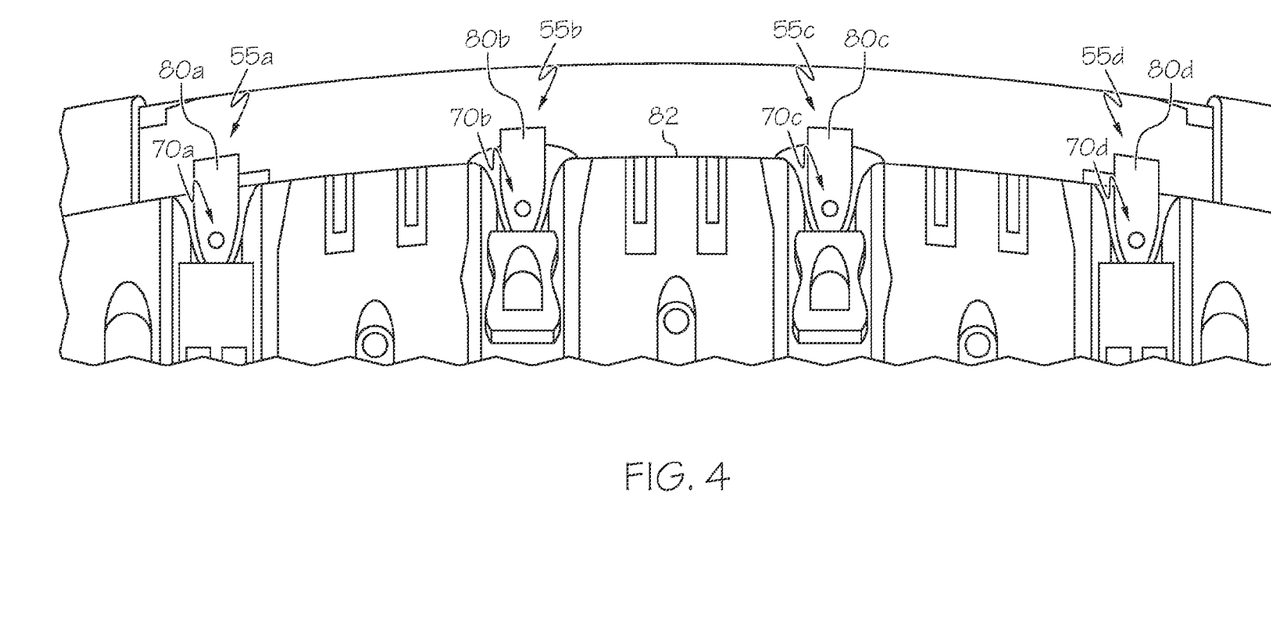
FIG. 4 depicts a bottom view of the lower projecting bumper portion of FIG. 3 according to one or more embodiments shown or described herein.

Referring briefly to FIG. 4, as can be seen, the vehicle lateral portion 55 of the lower reinforcement member 42 and bumper fascia 34 is only one of multiple vehicle lateral portions 55a-55d spaced-apart in the vehicle lateral direction, each having a fascia connection structure 70a-70b. The bumper fascia 34 may include multiple connectors 80a-80d that extend beyond a lower edge 82 of the bumper fascia 34 in the vehicle longitudinal direction. In the illustrated example, the connectors 80a-80d are strip form connectors 80a-80d that may or may not be integrally formed with the bumper fascia 34. For example, in one embodiment, the connectors 80a-80d may be integrally formed with the bumper fascia 34 of the same material using any suitable process and connected to the fascia connection structures 70a-70d. In another embodiment, the connectors 80a-80d may be formed separately from the bumper fascia 34 of a rigid or semi rigid material and connected to both the bumper fascia 34 and fascia connection structures 70a-70d using any suitable connection, such as fasteners thereby forming spaced-apart point connection locations to the lower reinforcement member 42. Materials used to form the connectors 80a-80d, bumper fascia 34 and lower reinforcement member 42 may include, as examples, thermoplastic olefins (TPOs), polycarbonates, polyesters, polypropylene, polyurethanes, polyamides, or blends of these with, for instance, glass fibers, for strength and structural rigidity. Any suitable methods can be used for forming the connection structures 80a-80d, bumper fascia 34 and lower reinforcement member 42, such as molding, machining, etc.

Figure 5:
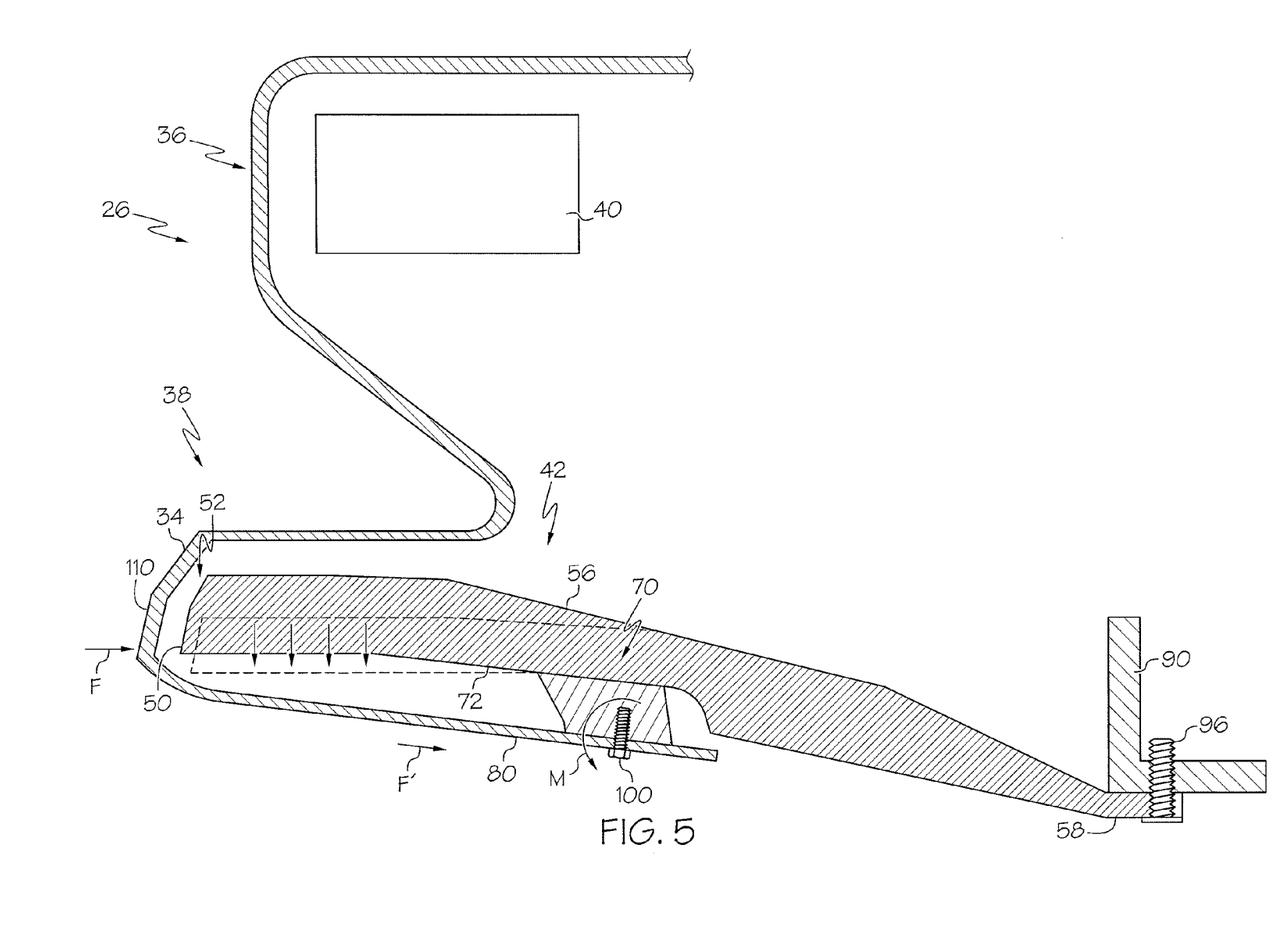
FIG. 5 depicts a diagrammatic side section view of the lower projecting bumper portion of FIG. 3 in operation according to one or more of the embodiments shown or described herein.

Referring to FIG. 5, a diagrammatic view of the lower projecting bumper portion 38 including the bumper fascia 34 and the lower reinforcement member 42 is illustrated. The lower reinforcement member 42 includes the reinforcement body 56 that has the front end 50 and the rear end 58 opposite the front end 50. The rear end 58 of the reinforcement body 56 may be fastened or cantilevered at a fastening location 96 to a vehicle support member 90, such as a lower radiator support and/or other suitable load-bearing structure configured to support the lower reinforcement 42 in the illustrated position and to operate under impact conditions. The lower reinforcement member 42 extends from the rear end 58 that is cantilevered to the vehicle support member 90 forward in the vehicle longitudinal direction to the front end 50. In some embodiments, the front end 50 may be elevated in the vehicle vertical direction higher or further from the ground than the rear end 58 creating a somewhat downward slope from the front end 50 to the rear end 58.

The fascia connection structure 70 is provided between the front portion 60 and the rear portion 62 of the reinforcement body 56. The fascia connection structure 70 extends downwardly from the bottom side 72 of the reinforcement body 56 to a fastening location 100. In some embodiments, the fascia connection structure 70 places the fastening location 100 between the fastening location 96 of the rear end of the reinforcement body 56 and the bottom side 72 at the front end 50 of the reinforcement body 56 in the vehicle vertical direction. The fastening location 100 may also place the connectors 80 below a front face 110 of the lower projecting bumper portion 38 of the bumper fascia 34 creating a somewhat downward slope from the front face 110 of the bumper fascia 34 to the fastening location 100 of the connectors 80.

FIG. 5 illustrates operation of the lower reinforcement member 42 during an impact. As a force F impacts the front face 110 of the bumper fascia 34, the bumper fascia 34 tends to deflect rearwardly in the vehicle longitudinal direction, particularly in light of the space 52 provided between the bumper fascia 34 and the lower reinforcement member 42. As the front face 110 of the bumper fascia 34 deflects rearwardly, a force F' is applied through the connectors 80 at the fastening location 100 between the reinforcement body 56 and the connectors 80, which, in this example, has both vertical (downward) and horizontal (rearward) components. This force F' can produce a bending moment in the direction of arrow M, which tends to pull the front end 50 of the reinforcement body 56 downwardly in the vehicle vertical direction thereby decreasing the distance between the front end 50 of the reinforcement body 56 to the ground (illustrated by dashed lines), at least initially (e.g., before the bumper fascia 34 contacts the front end 50 of the reinforcement body 56) under relatively low impact forces, such as less than 10 kN, such as less than 5 kN, such as less than 1 kN, such as between 1 kN and 10 kN. At higher impact forces, such as greater than 10 kN, the front end 50 of the reinforcement body 56 may move upwardly (e.g., after the bumper fascia 34 contacts the front end 50 of the reinforcement body 56), increasing the distance of the front end 50 from the ground.

Figure 6:
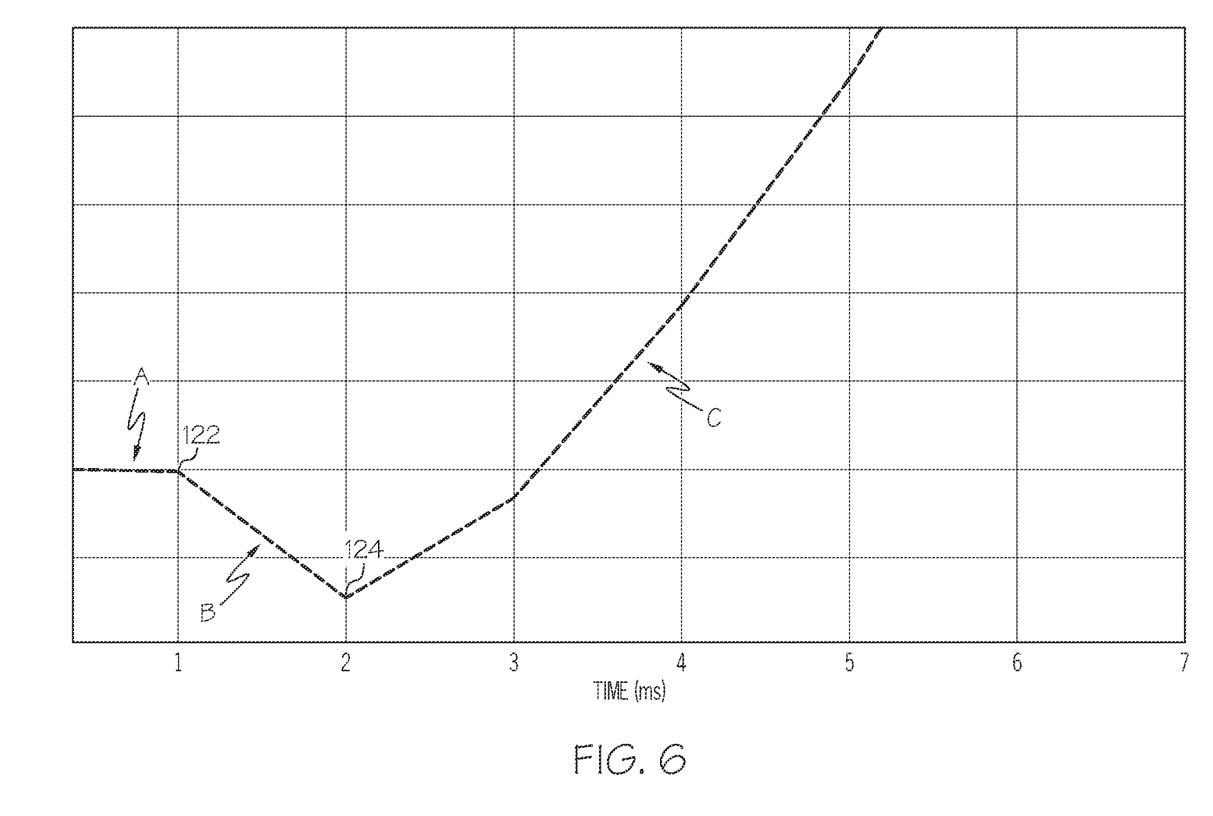
FIG. 6 illustrates an exemplary plot of movement at a front end of the lower reinforcement member versus time during an impact.

Referring to FIG. 6, vertical movement or distance from the ground of the front end 50 of the reinforcement body 56 is shown over time in milliseconds. This movement and timing are exemplary and not intended to be limiting as movement and timing may be more or less depending, at least in part, on the impact conditions, shape and positioning of the lower reinforcement member, etc. Section A of movement line 120 illustrates a baseline position of the front end 50 of the reinforcement body 56 under normal vehicle operating conditions and without impact. Upon an impact to the bumper fascia 34 at the lower projecting bumper portion 38 at impact point 122, the front end 50 of the reinforcement body 56 moves downward thereby decreasing a distance between the front end 50 and the ground in a somewhat linear fashion in section B. This movement can occur before contact is made between the bumper fascia 34 and the front end 50 of the reinforcement body 56 due to the space 52 (FIG. 5). As one example, the distance between the front end 50 of the reinforcement body 56 and the ground may decrease for about 1 millisecond and a distance of about 1.5 millimeters. As the impact forces increase, the front end 50 of the reinforcement body 56 begins an ascent at turnaround point 124 at section C thereby increasing in distance from the ground from the turnaround point 124. While a descent of about 1.5 mm is illustrated, movement of the front end 50 of the reinforcement body 56 toward the ground may be between about 1 mm and about 5 mm.

The above-described bumper assemblies provide bumper fascias that connect to the underside of lower reinforcement assemblies below the reinforcement bodies. Attachment of the bumper fascias to the undersides of the lower reinforcement assemblies provide a downward movement of the front end of the reinforcement bodies thereby decreasing a distance between the front end and the ground. Such decreases in distance between the front end and the ground can result in a decrease a bending moment seen by lower parts of the leg, such as the tibia. The location of the fastening location between the bumper fascia and lower reinforcement assembly can be tuned to provide a variety of movement characteristics, for example, based on vehicle model.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a vehicle support member at an underside of the vehicle; and
   a bumper assembly at a front of the vehicle comprising:
   a bumper fascia;
   a bumper reinforcement beam covered by the bumper fascia providing an upper projecting bumper portion; and
   a lower reinforcement member connected to the vehicle support member at a location below the bumper reinforcement beam in a vehicle vertical direction that is covered by the bumper fascia providing a lower projecting bumper portion, the lower reinforcement member includes a reinforcement body having a front end and a rear end, the bumper fascia being connected to the lower reinforcement member at a first fastening location that is located below reinforcement body.

2. The vehicle of claim 1, wherein the first fastening location is a first connecting location, the lower reinforcement member being connected to the vehicle support member at the rear end of the reinforcement body at a second fastening location.

3. The vehicle of claim 2, wherein the lower reinforcement member extends forward from the vehicle support member in a vehicle longitudinal direction toward the bumper fascia to the front end that is spaced from the bumper fascia in the vehicle longitudinal direction.

4. The vehicle of claim 3, wherein the first fastening location is located between the second fastening location and the front end in the vehicle longitudinal direction.

5. The vehicle of claim 4, wherein the first fastening location is located between the second fastening location and the front end in the vehicle vertical direction.

6. The vehicle of claim 1, wherein the bumper fascia being connected to the lower reinforcement member at the fastening location such that the front end of the reinforcement body moves downward in the vehicle vertical direction upon impact to the bumper fascia at the lower projecting bumper portion.

7. The vehicle of claim 1, wherein the lower reinforcement member comprises a fascia connection structure that extends outwardly from a bottom side of the reinforcement body to a connecting base providing the fastening location.

8. The vehicle of claim 1, wherein the bumper fascia includes a connector that extends beyond a lower edge of the bumper fascia in a vehicle longitudinal direction that is connected to the lower reinforcement member at the first fastening location.

9. The vehicle of claim 1, wherein the lower reinforcement member is connected to the bumper fascia at multiple fastening locations that are spaced-apart in a vehicle lateral direction.

10. The vehicle of claim 9, wherein the bumper fascia includes multiple connectors extending beyond a lower edge of the bumper fascia in a vehicle longitudinal direction that are connected to the lower reinforcement member at the multiple fastening locations.

\* \* \* \* \*